Figures 1, 4, 5:
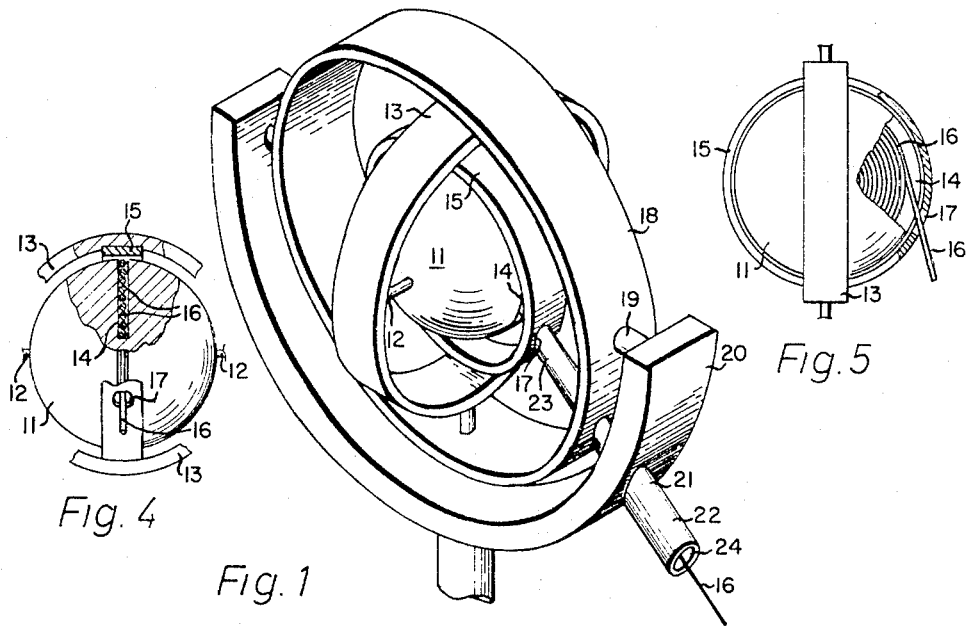

Sept. 20, 1966    M. EPSTEIN ETAL    3,273,406
GYRO MECHANISMS
Filed Nov. 6, 1962

INVENTORS
MOSHE EPSTEIN
MEIR DROR
BY
Attorneys 3,273,406
GYRO MECHANISMS
Moshe Epstein, 27 Wedgewood Blvd., Haifa, Israel, and
Meir Dror, 13 Hagefen St., Sabinia, near Kiriat Bialik,
Israel
Filed Nov. 6, 1962, Ser. No. 235,775
Claims priority, application Israel, Nov. 14, 1961,
16,320; Nov. 15, 1961, 16,328
10 Claims. (Cl. 74—5.12)

It is an object of the present invention to provide reliable means for the acceleration of a gyro mechanism. It is a further object of the present invention to provide such means which can be used repeatedly. It is a further object of the present invention to provide such gyro-mechanism which is universally mounted and which is provided with means for securely locking the frames of the universal mounting while said gyro mechanism is being actuated, and for releasing said frame after the actuation so that the gyro can take up any spatial position. Other and further objects of the invention will become apparent hereinafter.

Hitherto, gyro mechanism have been actuated by mechanical means, by electricity, by a jet of air and the like more. The use of simple means of actuation, such as a rope or wire, is well known from toys and from scientific demonstration instruments. Such rope or wire is wound either on the stem of the rotor wheel in a haphazard manner, or it is wound on the surface of the rotor wheel or in a groove provided in the stem or wheel so as to result in a plurality of overlying adjacent windings.

All these mechanical arrangements described above have drawbacks as regards their reliability. The rope or wire is likely to become entangled while being pulled off, especially if the pull exerted on the rope or wire is not of a steadily accelerated velocity.

When the gyro mechanism is to be used as component of measuring means, for the stabilization of a moving body or the like, it is imperative that the means resorted to for accelerating the said gyro are to be of a reliable nature, and as foolproof as possible. The novel mechanism according to the present invention overcomes the drawbacks mentioned, resulting in a very reliable, yet simple device which gives accurate and reproducible results.

If the gyro mechanism is to be used in a scientific measurement instrument, it is sometimes imperative to define the position, of the rotor after actuation as "zero-reading" and to follow subsequently after the changes of position of the rotor respective the supporting gimbals of the universal mounting. This can be attained by resorting to a combination of the novel means for actuating the gyro mechanism and of a novel locking and release mechanism.

The novel gyro actuating mechanism comprises in combination a rotor wheel the axle of which is pivotally mounted in suitable bearings, a narrow deep annular slit of uniform width being provided in the rotor wheel at either a right angle with the axis of rotation, or at an inclination so as to define a conical surface or in the form of a conoidal surface, an annular caging bracket being positioned around said rotor wheel so as to surround the opening of said slit, a rope or wire of such diameter as to be adapted to be wound in said slit in the form of a single layer spiral, an opening being provided in said bracket through which said wire or rope may be inserted and pulled out, said bracket being at such distance from the slit that the wire or rope will not be able to escape from said slit, except through said opening. It is clear that the term "single layer spiral" includes the arrangement of adjacent windings in a staggered position with each other. This will be the case when the diameter of the rope or wire will be about six tenths of the width of the slit, while a diameter of about nine tenths will result in a position of one winding substantially directly over the other adjacent one. While theoretically a rope or wire of a diameter above half the diameter of the width of the slit can be used, if elastic deformations are to be neglected, it will be sufficiently safe to use wires or ropes of above six tenths of the width of the slit, depending on the material used. It is preferred to use a slit in the median plane of the rotor wheel, perpendicular to the axis of rotation. This slit may be displaced by a certain distance from this median plane. It is also possible to resort to the use of a slit inclined towards the direction just defined, defining a conical surface or a slit having a conoidal shape.

Figure 2:
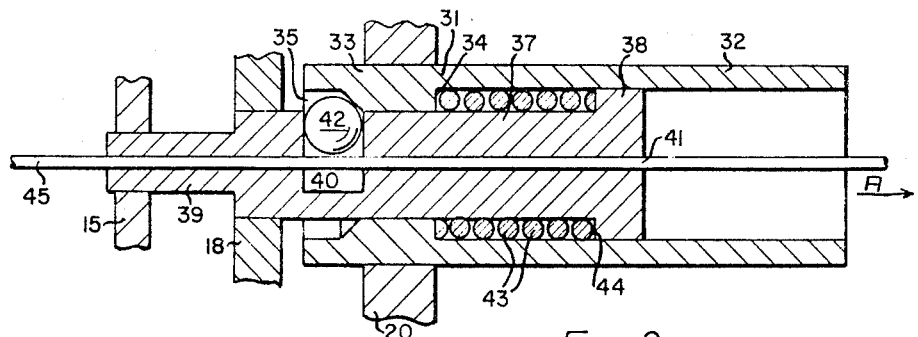
Figure 3:
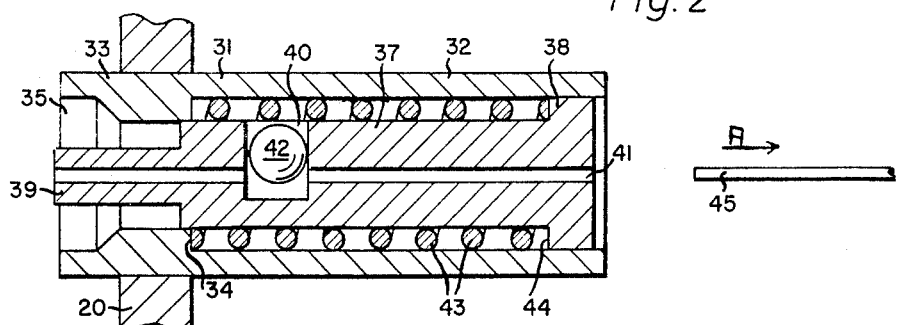

In order that a better understanding may be had of the invention, it will now be described by way of example only with reference to the enclosed drawing, in which:

FIGURE 1 is a schematic perspective view of a universally mounted gyro mechanism according to the invention, provided with locking and release means for the supporting gimbals;

FIGURE 2 is a schematical longitudinal cross-section through a locking and release mechanism of the type shown in FIGURE 1, FIGURE 3 is a schematical longitudinal cross-section through the mechanism of FIGURE 2, in released position, FIGURE 4 is an elevational front view, showing partly in section the spherical rotor of a mechanism as shown in FIGURE 1, its caging bracket and one of the supporting gimbals, FIGURE 5 is an elevational side view of the device shown in FIGURE 4, also partly in section.

As shown in FIGURE 1, the gyro mechanism comprises a spherical rotor 11, mounted by means of pivots 12 in ball bearings affixed to frame 13, which ball bearings are not shown in the drawing. At the median plane of the spherical rotor 11, perpendicular to the axis defined by pivots 12, there is provided a deep narrow slit of uniform width 14. A caging bracket 15 surrounds this slit 14. The distance of this caging bracket is not shown here in true proportion, and its actual distance from the rotor wheel is as shown in FIGURES 4 and 5. On said rotor, in said slit 14 there is firmly wound a rope or wire 16 of such diameter so as to result in a single layer spiral winding which will not become jammed when being pulled out from said slit. An opening 17 is provided in said bracket 15, wherethrough said rope or wire can be inserted and pulled out.

The material and size of the rope or wire will be chosen according to the size of the gyro mechanism and according to the required acceleration and speed of rotation required. Depending on the required rotational velocity, satisfactory results can be attained with a suitable strand of plastic material of the nylon-type, of substantially circular cross-section or with a metal wire of stainless steel or the like. When a wire is used, it is advantageous to provide its end which is inserted first into the slit with a plurality of bends, at a small angle with each other and not in one plane. Due to these bends, the wire is slightly stuck in the slit as it is inserted, and thus it is easier to wind tightly the first of the windings.

The caging bracket 15 is rigidly connected with the gimbal 13, which latter is pivotally arranged in gimbal 18, which is pivotally arranged by means of pivots 19 in the rigid frame 20. There is provided a locking and release device 21, which will be described in greater detail with reference to FIGURES 2 and 3. This mechanism comprises a fixed part 22, which is rigidly attached to the frame 20, while a protruding, retractable part 23 engages the gimbals 18 and 13, the latter being engaged and rigidly held through the fastening of the caging bracket 15.

The Cardanic suspension is well known and need not be elaborated in greater detail.

In order to actuate the rotor, the wire 16 is pulled out through the end 24 of the locking and release device 21, and after the passage of the wire through the device 21, the rotor will revolve at a high speed, while the protruding part 23 will be retracted, freeing the gimbals to move in an unconstrained manner in relation to the axis of rotation of the rotor.

The actuating mechanism is described in greater detail with reference to FIGURES 4 and 5. The spherical rotor 11 is adapted to be mounted by means of pivots 12 in gimbal 13, which is not shown. The slit 14 extends to an appreciable depth, and its opening is surrounded by means of the caging bracket 15. In this bracket 15 there is provided an opening adapted for the insertion of the wire or rope 16, and for possible engagement by the locking and release mechanism 21. The wire 16 is of a diameter slightly smaller than the width of the slit. The distance of the caging bracket from the opening of the slit is such that the wire or rope will not be able to escape. The caging bracket 15 is rigidly attached to gimbal 13.

As shown in FIGURES 2 and 3, the locking and release mechanism according to the present invention comprises a cylindrical member 31, having a rear part 32 with a bore of uniform internal diameter and a front part 33 with a bore of internal diameter smaller than the first bore, a shoulder 34 being formed between said rear part 32 and front part 33, a recess 35 being provided in said part 33, having a sloped shoulder towards its rear part, a piston having a rear part of a diameter corresponding with that of the rear part of cylinder 31 and a front part of reduced diameter 39, a recess being provided in said part, open towards the inner wall of cylinder 31, an axial bore 41 being provided through said recess 40, said recess being adapted to hold a sphere 42, and a spiral spring 43 surrounding said piston abutting at its one end the shoulder 34 and at its other end the shoulder 44 formed between the parts of different diameter 38 and 37 of the piston; a sufficiently rigid wire 45 of a diameter adapted to pass through the axial bore 41 and fitting into the slit in the rotor 11 being provided, the arrangement of the parts being such that when the spring 43 is compressed to the position shown in FIGURE 2, the sphere 42 will be pushed into the position engaging the recess 40 when the wire 45 is passed through the axial bore so as to pass through said recess, locking said sphere and with it the piston in a position where the front part of the piston protrudes from the cylinder, so as to engage the gimbals of the Cardanic suspension. When the wire 45 is pulled through this device in the direction of the arrow A, after its left-hand end passes through the recess 40, the sphere will recede into this recess and the piston will be retracted into the cylinder 31, releasing the gimbal 18 and the caging bracket 15 with the gimbal 13 which is attached to the latter.

It is clear that both the use of the locking and release device as well as the use of a Cardanic suspension are optional.

Gyro mechanisms according to the present invention can be used in scientific instruments, in gyro-compasses, course recorders, gyro-stabilizers, roll and pitch recorders, artificial horizons and the like more.

The duration of effective rotation will depend on the details of the specific construction. Without difficulty it is possible to attain speed exceeding 10,000 r.p.m. and effective running times of above half an hour. It is clear that the mechanism can be repeatedly used.

It is clear that the present disclosure is illustrative and not restrictive and that numerous changes in the details of the mechanism, combination and arrangement of parts may be resorted to without departing from the spirit and scope of the invention. It is stressed that the use of functional equivalents of the components and the arrangement of parts are intended to be embraced by the present patent application.

What we claim is:

1. A gyro mechanism comprising in combination a rotor, a narrow annular slit of uniform width being provided in said rotor at an angle with the axis of rotation, an annular bracket being positioned in fixed spatial relation to said rotor so as to surround the opening of said slit, a wire of such diameter as to be adapted to be wound in said slit in the form of a single layer spiral, an opening being provided in the annular surrounding bracket through which said wire may be inserted and pulled out, said bracket being at such distance from said slit so as to prevent the escape of the wire from said slit.

2. A gyro mechanism as claimed in claim 1, wherein the slit is at a right angle with the axis of rotation.

3. A gyro mechanism as claimed in claim 1, wherein the slit is provided about the median plane of the rotor.

4. A gyro mechanism as claimed in claim 1, wherein the diameter of the wire is between six tenths to nine tenths of the width of the slit.

5. A gyro mechanism as claimed in claim 1, wherein the distance of the annular bracket from the edge of the slit equals between three tenths to nine tenths of the diameter of the wire.

6. A gyro mechanism as claimed in claim 1, wherein the end of the wire which is to be inserted first into the slit is provided with a plurality of bends in at least two different planes.

7. A gyro mechanism, comprising in combination a rotor mounted in gimbals so as to have at least two degrees of freedom, a narrow annular slit of uniform width being provided in said rotor at an angle with the axis of rotation, an annular bracket being positioned in fixed spatial relation to said rotor so as to surround the opening of said slit, a wire of such diameter as to be adapted to be wound in said slit in the form of a single layer spiral, an opening being provided in the annular surrounding bracket through which said wire can be inserted and withdrawn, said bracket being at such a distance from the slit as to prevent the escape of the wire from the slit, means being provided for fixedly holding in place said gimbals during the time of withdrawal of the said wire when the rotor is actuated and for automatically freeing said gimbals after the withdrawal of said wire.

8. A gyro mechanism as claimed in claim 7, wherein the gimbals form a Cardanic suspension.

9. A gyro mechanism as claimed in claim 7, including locking and releasing means which comprises in combination a gyro gimbal support a cylindrical member, a piston having a rear part slidable in said cylindrical member including a reduced diameter front part extending outwardly through one end of said cylindrical member, a spring located between the inner wall of said cylindrical member and said piston rear part which is adapted to be compressed in such manner that it tends to move said piston relative said cylindrical member, a locking mechanism which consists of a spherical member adapted to engage both said cylindrical member and piston, said spherical member being located in a recess in said piston and held in such position as to protrude from said piston engaging a recess in the side wall of said cylindrical member, said cylindrical member being rigidly connected with said gyro gimbal support, the wire passing longitudinally through said piston and through the said recess wherein there is located said spherical member in such manner as to pass behind said spherical member maintaining it in a locking position so that part of the piston protrudes from the cylindrical member engaging the said gimbals and holding same in place, the withdrawal of the wire resulting in the actuation of the rotor and resulting after the passage of its end through said recess in a quick retraction of the piston, releasing the said gimbals.

10. A gyro mechanism as claimed in claim 7, characterized in that the slit is perpendicular to the axis of rotation of the rotor.

References Cited by the Examiner

UNITED STATES PATENTS

| | | | |
|---|---|---|---|
| 942,952 | 12/1909 | Wrather | 74—5.7 X |
| 2,415,899 | 2/1947 | Meyer et al. | 74—5.12 |
| 2,666,276 | 1/1954 | Huff | 74—5 X |

FOREIGN PATENTS 1,265,328   5/1961   France.

MILTON KAUFMAN, *Primary Examiner.*

BROUGHTON G. DURHAM, PALMER W. SULLIVAN, *Examiners.*

T. W. SHEAR, *Assistant Examiner.*